United States Patent [19]
Hobbs

[11] 3,757,901
[45] Sept. 11, 1973

[54] DOUBLE GATE TORTUOUS GRIP ROPE BRAKE

[76] Inventor: Edwin L. Hobbs, P.O. Box 295, Moraga, Calif. 94556

[22] Filed: Aug. 11, 1972

[21] Appl. No.: 279,873

[52] U.S. Cl. .................................. 188/65.4, 182/5
[51] Int. Cl. ............................................. B65h 59/14
[58] Field of Search .......................... 188/65.3, 65.4; 182/5, 6, 7

[56] References Cited
UNITED STATES PATENTS
3,217,840  11/1965  Holkesvick .................... 188/65.4

FOREIGN PATENTS OR APPLICATIONS
239,832  6/1967  U.S.S.R. ........................... 188/65.4

Primary Examiner—George E. A. Halvosa
Attorney—James R. Cypher

[57] ABSTRACT

A rope brake for use with an elongated flexible member such as a rope consisting briefly of a frame having a closed opening for non-releasable attachment of carabiners and other safety rings and two separate gated openings for receipt of a line. A brake bar slides upon the frame engaging the line in various degrees of frictional contact and a cam surface on the frame terminating in a shoulder permits holding the brake bar in or out of braking position.

7 Claims, 9 Drawing Figures

PATENTED SEP 11 1973 3,757,901

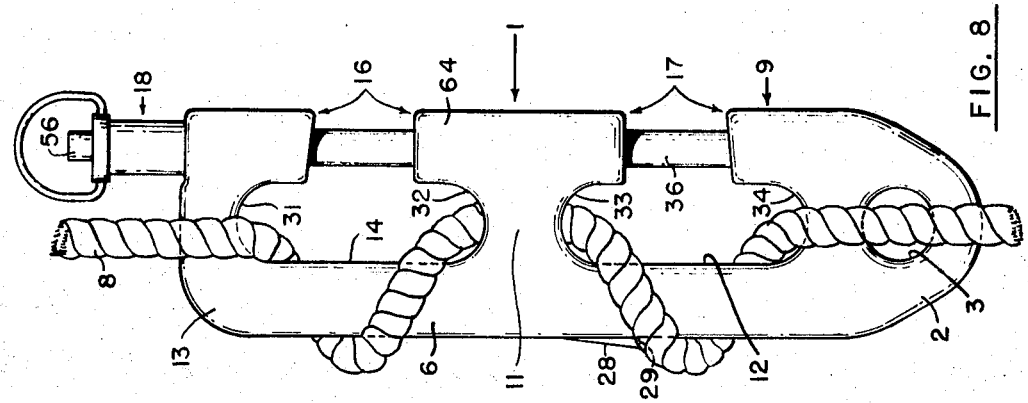
FIG. 9
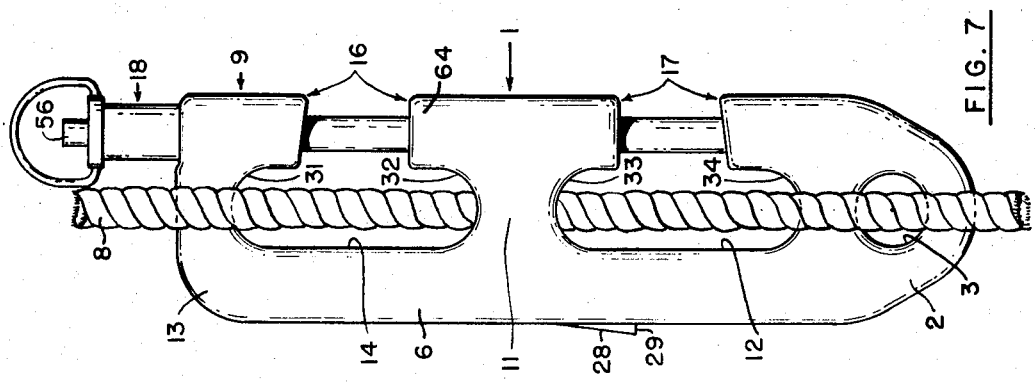
FIG. 8
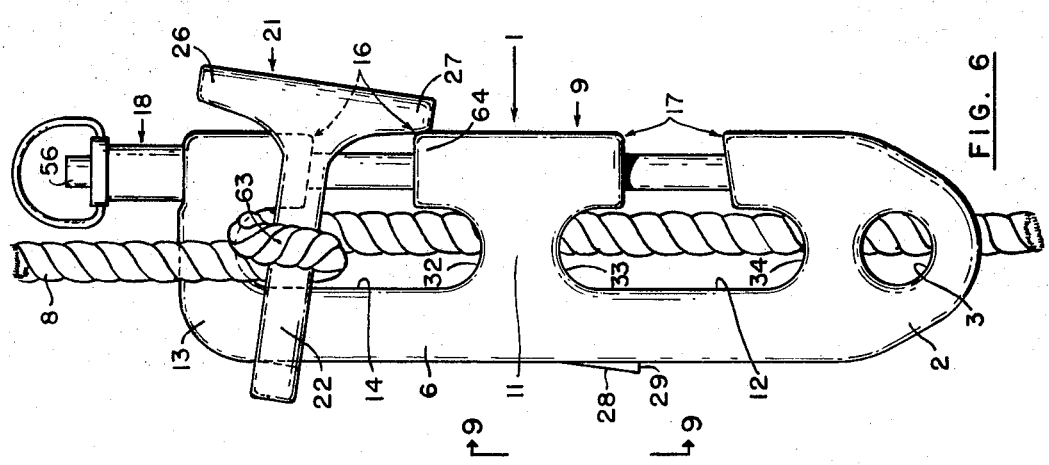
FIG. 7
FIG. 6

DOUBLE GATE TORTUOUS GRIP ROPE BRAKE

BACKGROUND OF THE INVENTION

The present invention is an improvement of my Tortuous Grip Rope Brake described in U.S. Pat. application Ser. No. 147,873 filed May 28, 1971, now U.S. Pat. No. 3,695,397, and co-pending with this application. In the previous application, the device had but a single gate opening and it was not possible for the user to use the brake bar at the lower end of the device unless the lower end of the rope was threaded through the closed opening and the brake bar. This prevented full utilization of the device, that is, winding the rope upon one side and using the brake bar by those who desired to attach themselves to the midportion of the line without finding the end of the rope. Firemen, window washers and others had such a need when the rope or line was suspended from the top of a building and they wished to attach to the rope at a mid-story level quickly without pulling up a long length of line which might stretch to the ground level several floors below.

Further, in the use of the prior device, it was difficult to release the brake when the device was underload. The rope binding about the brake bar required more effort than was desired for efficient use.

Another problem was the need to hold the brake bar out of braking position so that the direction of the line could be reversed as when the user was climbing but still wanted to be able to quickly place the brake bar in the braking position at the end of the climb.

SUMMARY OF THE INVENTION

The gist of the present invention is the use of a double gate to permit greater use of the brake bar mechanism and the use of a cam and projection on the device to hold the brake bar in and out of braking position.

An object of the present invention is to provide a rope braking device which will enable the user to attach to any point along the line without finding the end of the line.

Another object is to provide a brake bar device which will enable the user to position the brake bar mechanism in a braking and a non-braking position.

A further object is to provide an improved rope brake which is easier to use and more versatile.

BRIEF DESCRIPTION OF THE DRAWINGS

FIG. 6 is a side view of the device showing an alternate positioning of the brake bar.

FIG. 7 is a side view of the device without the brake bar.

FIG. 8 is a side view of the device showing another use of the device.

FIG. 9 is an end view of a portion of the device taken along line 9—9 of FIG. 6.

BRIEF DESCRIPTION OF THE PREFERRED EMBODIMENTS OF THE INVENTION

Figure 1:
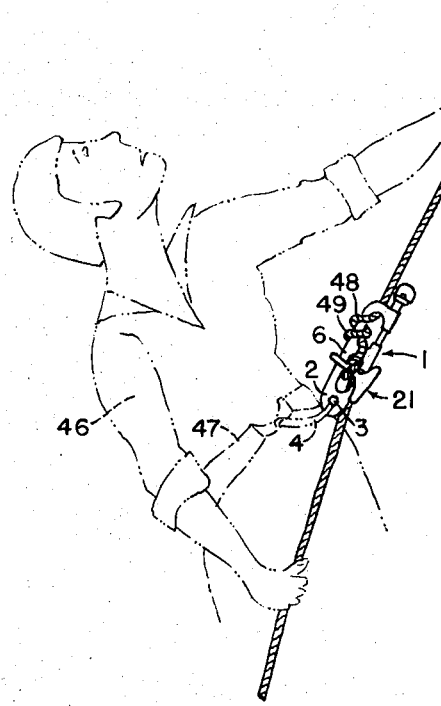
FIG. 1 is a perspective view of a rope brake apparatus constructed in accordance with the present invention shown in a typical use situation.

The rope brake device of the present invention consists briefly of a base member 2 having an opening 3 therein adapted for receiving a ring 4 or flexible line; a first elongated side member 6 connected to the base and extending therefrom at substantially a right angle and adapted for receiving an elongated flexible line 8 wound thereon; a second elongated side member 9 connected to the base and spaced from the first side member extending in substantially the same plane as the base and first side member; a cross member 11 spaced from the base and joining the first and second sides and forming a first enclosable opening 12 having an area several times greater than the area of a line adapted to be received therethrough; an elongated top member 13 joining the first and second side members and extending at substantially right angles therefrom spaced away from the cross member and in substantially the same plane therewith and forming a second enclosable opening 14 substantially equal to the first opening; the second elongated side member formed with an upper gate opening 16 between the top member and the cross member communicating with the second enclosable opening adapted for receiving a line therethrough; the second elongated side member being formed with a lower gate opening 17 between the base and the cross member communicating with the first enclosable opening adapted for receiving a line therethrough; gate means 18 having a first position providing a clear opening at the upper and lower gate opening, a second position closing the upper gate opening, and a third position closing the upper and lower gate opening; and resilient means 19 releasably locking the gate in the second and third positions.

The above described apparatus may be used with or without a brake bar 21 which includes a rigid band 22 dimensioned to closely encircle the side members and to freely slide longitudinally thereover and further dimensioned to be in close fitting relationship with the top member and the cross member and adapted to receive a line between the band the top member and the cross member in binding relationship so as to prevent further sliding on the sides and to lock the line in fixed relationship wherewith.

The brake bar may be formed in the shape of a "C" with the ends 23 and 24 of the band occurring generally between the side members. Further, the brake bar is formed with upper and lower end projections 26 and 27 dimensioned to span the gate openings.

An important feature of the present invention is the brake control device. This consists of forming a cam surface 28 on the first side member which projects away from the side permitting the brake bar to ride smoothly toward the base member. The cam surface terminates in an angular projecting shoulder 29 restricting movement of the brake bar away from the base. The projecting shoulder is located below the cross member a distance at least equaling the sum of the thickness of the brake bar band and the diameter of the line adapted to be inserted therebetween.

Another feature of the invention is a special design configuration which guides the line toward the center of the device. The side members are spaced a distance apart approximately equal to two diameters of the line it is best adapted to be used with. Further, the upper and lower portions 31, 32, 33 and 34 of the openings are smoothly rounded to guide the line toward the center.

The gate means is similar to the gate means described in my co-pending application Ser. No. 147,873 except for the provision necessitated by the double gate. Briefly, the gate means includes an elongated tube 36; an elongated rod 37 positioned within the tube and moveable between the first, second and third positions; a resilient spring means 19 biasing the rod to the first "lock" position; lock means 38 operatively connected to the rod and protruding from the tube in the first position of the rod and moveable to a nonprotruding position in the second "unlocked" position of the rod; the top member having an opening 39 therethrough to permit the tube to slide therethrough, the second side member having an opening 40 and 41 axially therethrough to permit entry of the tube and movement through a portion thereof; and stop means 42, 43 and 44 engaging the lock means in the first, second and third positions.

Figure 2:
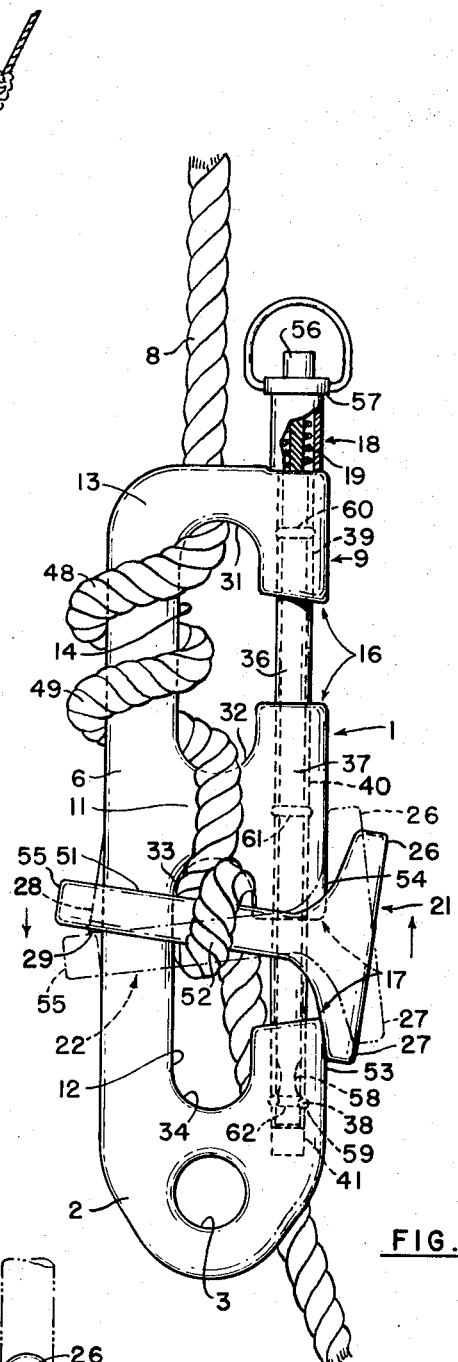
FIG. 2 is an enlarged side view of the apparatus shown in FIG. 1.
Figure 4:
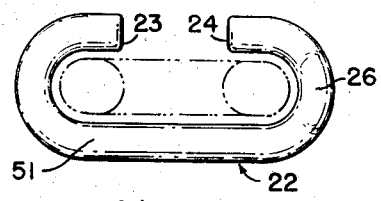
FIG. 4 is a top view of the brake bar.
Figure 3:
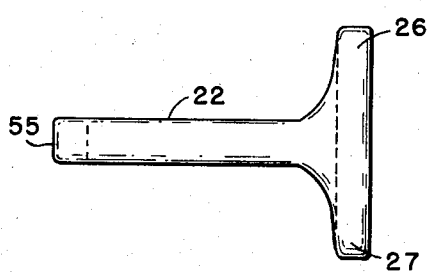
FIG. 3 is a side view of the brake bar mechanism.
Figure 5:
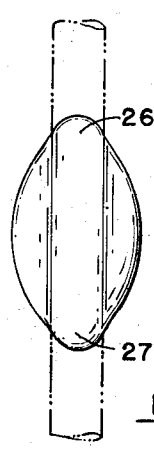
FIG. 5 is an end view of the brake bar.

Referring to FIG. 1, a workman 46 is shown wearing a safety belt 47. A ring or carabiner 4 is attached to his belt and the carabiner is connected to therope brake through opening 3. The most common way of attaching the line to the apparatus is shown in FIG. 2 in which line 8 is wrapped around side 2 one or more turns as indicated by numbers 48 and 49. The line continues down over the cross member and is then threaded behind portion 51 of the brake bar then around portion 22 one turn as indicated by number 52, through opening 12 and behind base 2.

The brake bar is shown in two positions. In the solid line position, the device will automatically brake a person to a stop in relation to line 8. The greater the weight placed on the device at the opening 3 in the base, the greater is the braking force. This is caused by mechanism moving downwardly in relation to the line. as the device moves downwardly, the loop at 52 in the line pulls the brake bar upwardly, thereby pinching the line between member 51 of the brake bar and the cross member 11. When the brake bar is pulled up tightly, the bar tends to tip as shown in FIG. 2 with the lower projection 27 in contact with portion 53 of the side, and top projection 26 moved outwardly from portion 54 of the side. The tilting is caused by the cam face 28 projecting out from the second side and by the upward pulling force of the line at a point on the brake bar which is slightly off center. As stated above, the line is narrowly restricted to the approximate center of the device by the closeness of the side members and the rounding of the top portion 33 of the opening.

On prior brake devices, releasing the brake was sometimes difficult, particularly if the weight was great and there were just a few turns on the first member. Brake release has been simplified on the present device by merely pushing against projection 26 to rotate the device in a counterclockwise direction as shown in FIG. 2 and then pulling downward on end 55 of the brake bar. A movement of only a short distance is necessary to release the braking effect. Thus, a movement of the brake bar to approximately the dotted lines as shown in FIG. 2 is required.

In prior devices, it was difficult to keep the mechanism in the brake release mode. This problem has been solved by the cam surface 28 and projection 29 on the present device. While the cam surface makes it easier to unlock the brake because it projects out from the side at a small angle of about 20°, the projection 29 prevents the brake bar from moving back to the braking position unless the brake bar is manually moved by the user. It is to be noted here that it seems easier to take the brake off because the hand is capable of moving an object a short distance even though the force is relatively great if it is not necessary to hold the object once movement is obtained. Thus, a large force can be exerted by the hand to move the brake bar a short distance and then immediately relax and move to another position.

To place the brake back in the locked position the operation is reversed. This time the hand pushes projection 27 to the left as shown in FIG. 2 to rotate the brake clockwise. At the same time, end 55 is lifted over the projection 28. No further effort is necessary as the loop in the line will usually carry the brake bar into the locking position.

As noted earlier, one of the features of the double gate device is the ability to attach the line to the device without finding the end of the line. In my previous device it was possible to loop the line on the side by opening the gate and passing the line through opening 16, but it was not possible to use the brake without finding the end of the line. As here shown, the gate may be removed from opening 16 by pushing downwardly on button 56 with one finger while placing two other fingers beneath shoulder 57. This pushes rod 37 downwardly against the bias of the spring and permits ball bearings 38 to slide into necked portion 58 of the rod. The bearings move out of openings 59 and permit the tube 36 to be removed upwardly. When the tube has cleared opening 16, the line can be wrapped on the device as shown. Annular groove 60 holds bearings 38 of the tube 36 to prevent separation of the tube from the device.

In order to place the line around the brake bar without finding the end of the line, the gate means is operated as above. An annular groove 61 receives the bearings 38 to hold the tube in position to close opening 16 and open opening 17 while annular groove 62 holds the bearings at the lower portion of the device to close both openings.

When the gate is removed from opening 17, the line can be inserted therethrough and wrapped about portion 51 of the gate shown. The brake bar itself is swung out of opening 17 by pivoting the bar around side 6. After the line is wrapped about the bar, it is swung back over the opening and the gate mechanism is lowered so that the bearings are moved against annular groove 62. Closing the gate means prevents the brake bar from separating from the rest of the apparatus.

Referring to FIG. 6, the brake bar may be used in conjunction with the upper opening 16. The line is wrapped around the brake bar in a single loop 63 and braking is effected by pinching the line between the brake bar and the upper member 13. Note that the lower projection 27 strikes portion 64 of the side member and is tipped slightly as shown. The entire opening 16 is covered by the end of the brake bar.

Another configuration of the line 8 with the device is shown in FIG. 7. Here, the line passes in front of top member 13, behind cross member 11 and in front of the base 2. The change in direction of the line causes frictional braking. This configuration gives greater braking with a larger line.

Still another configuration of the line with the device is shown in FIG. 8. Here the line uses both the side member and the cross member to achieve frictional braking. The configurations in FIGS. 7 and 8 may be used with or without the brake.

I claim:

1. A double gate tortuous grip rope brake comprising:
   a. a base member having an opening therein adapted for receiving a ring or flexible line;
   b. a first elongated side member connected to said base and extending therefrom at substantially a right angle and adapted for receiving an elongated flexible line wound thereon;
   c. a second elongated side member connected to said base and spaced from said first side member extending in substantially the same plane as said base and first side member;
   d. a cross member spaced from said base and joining said first and second sides and forming a first enclosable opening having an area several times greater than the area of a line adapted to be received therethrough;
   e. an elongated top member joining said first and second side members and extending at substantially right angles therefrom spaced away from said cross member and in substantially the same plane therewith and forming a second enclosable opening substantially equal to said first opening;
   f. said second elongated side member being formed with an upper gate opening between said top member and said cross member communicating with said second enclosable opening adapted for receiving a line therethrough;
   g. said second elongated side member being formed with a lower gate opening between said base and said cross member communicating with said first enclosable opening adapted for receiving a line therethrough;
   h. gate means having a first position providing a clear opening at said upper and lower gate opening, a second position closing said upper gate opening, and a third position closing said upper and lower gate openings; and
   i. resilient means releasably locking said gate in said second and third positions.

2. A rope brake device as described in claim 1 comprising:
   a. said side members are spaced a distance apart equal to approximately two diameters of the line it is adapted to be used with; and
   b. said upper and lower portions of said openings are smoothly rounded to guide said line toward the center of said device.

3. A rope brake apparatus as described in claim 1 comprising:
   a. said gate means including an elongated tube;
   b. an elongated rod positioned within said tube and moveable between said first, second and third positions.
   c. resilient spring means biasing said rod to said first "lock" position;
   d. lock means operatively connected to said rod and protruding from said tube in said first position of said rod and moveable to a non-protruding position in said second "unlocked" position of said rod;
   e. said top member having an opening therethrough to permit said tube to slide therethrough and said second side member having an opening axially therethrough to permit entry of said tube and movement through a portion thereof; and
   f. stop means engaging said lock means in said first, second and third positions.

4. A rope brake as described in claim 1 comprising:
   a. a brake bar including a rigid band dimensioned to closely encircle said side members and to freely slide longitudinally thereover and further dimensioned to be in close fitting relationship with said top member and said cross member and adapted to receive a line between said band and said top member and said cross member in binding relationship so as to prevent further sliding on said sides and to lock said line in fixed relationship therewith.

5. A rope brake as described in claim 4 comprising:
   a. said brake bar being formed in the shape of a "C" with the ends of the band occurring generally between said side members.

6. A rope brake as described in claim 4 comprising:
   a. said first side member being formed with a cam surface projecting away from said side permitting said brake bar to ride smoothly toward said base member, and said cam surface terminating in an angular projecting shoulder restricting movement of said brake bar away from said base; and
   b. said projecting shoulder being located from said cross member at least the distance equaling the sum of the thickness of said brake bar band and the diameter of a line adapted to be inserted therebetween.

7. A rope brake as described in claim 4 comprising:
   a. said brake bar being formed with upper and lower end projections dimensioned to span said gate openings.

* * * * *